Aug. 20, 1940.　　　M. L. ECKMAN　　　2,212,154
WELDING DEVICE
Filed Oct. 4, 1938
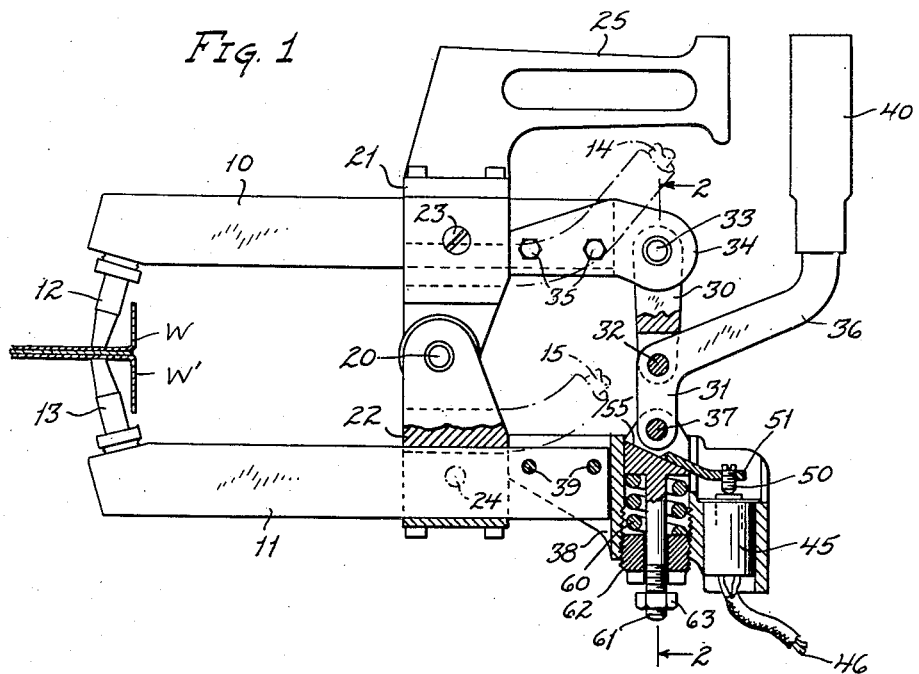
Fig. 1
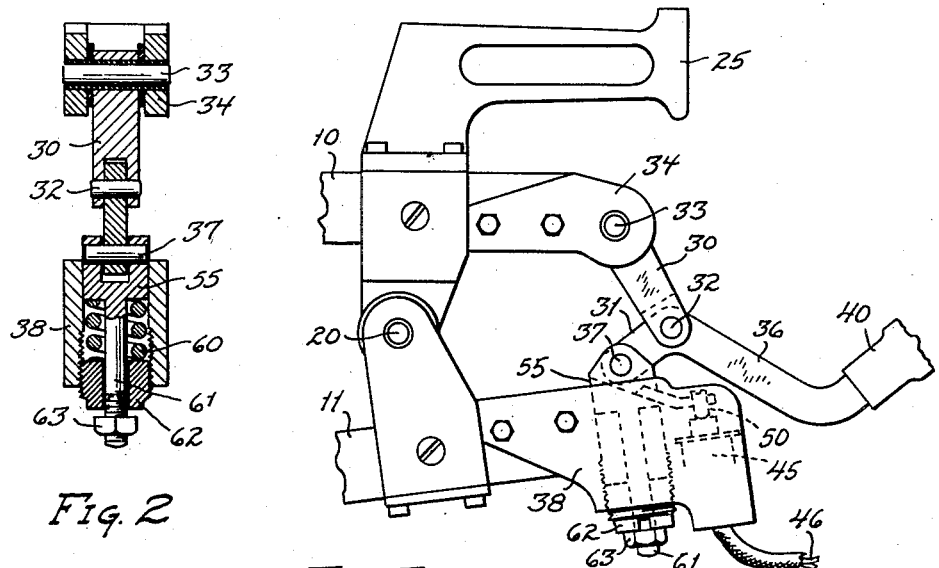
Fig. 2
Fig. 3
INVENTOR.
MERIL L. ECKMAN
BY Bates, Goldrick, & Teare
ATTORNEYS Patented Aug. 20, 1940

2,212,154

UNITED STATES PATENT OFFICE 2,212,154

WELDING DEVICE

Meril L. Eckman, Cleveland, Ohio, assignor to The American Coach & Body Company, Cleveland, Ohio, a corporation of Ohio Application October 4, 1938, Serial No. 233,279

7 Claims. (Cl. 219—4)

This invention relates to electric welding apparatus and particularly to a portable spot welder which can be transported to the work and manipulated by the operator for applying a set of electrodes to the work and effecting a spot welding operation.

An object of the invention is to make a portable device of the character described which is applicable to a tool that enables an operator to press the electrodes with considerable force against the work, and which will assure the exertion of sufficient pressure to result in a satisfactory weld. In this connection, my invention includes a circuit controller that requires the exertion of a predetermined pressure against the work before current is allowed to flow through the electrodes but which automatically causes the current to flow when pressure exerted against the work reaches a predetermined force.

Referring now to the drawing, Fig. 1 is a side view partly in section showing a spot welding tool or gun embodying my invention; Fig. 2 is a section taken through the line 2—2 in Fig. 1, and Fig. 3 is a side view of a portion of the gun showing the relationship of the parts prior to the welding operation.

The gun on which the present invention is illustrated comprises two electrically conductive bars which are shown as upper and lower members 10 and 11 respectively. These bars carry electrode tips 12 and 13 respectively which are arranged to contact opposite sides of the work which in the drawing is designated W and W'. Current may be conducted to the electrodes through insulated conduits which are indicated at 14 and 15 respectively. The bars 10 and 11 are adapted to be pivotally connected at 20 intermediate their ends by means of bracket members 21 and 22 which are slidably mounted on the bars 10 and 11 respectively, and are adapted to be clamped in any desired position by set screws 23 and 24 respectively. By mounting the brackets in this manner, the pivot point 20 may be shifted longitudinally of the bars in order to vary the degree of force that is to be exerted by the electrodes against the work. For convenience in handling, the brackets 21 terminate in a handle 25 which may be conveniently grasped by an operator.

To move the electrodes about the pivot 20, I prefer to utilize a toggle mechanism which comprises links 30 and 31 that are pivotally connected at 32 in the desired position adjacent the end of the bars remote from the electrode. The link 30 may be fastened to the bar 10 by a pivotal connection 33 to a bracket 34 which is attached, as by securing members 35, to the bar, and which is shown as projecting from the end thereof. The link 31 forms part of an arm 36, one end of which is pivotally connected at 37 to a bracket 38 that is attached, as by securing members 39 to the bar 11. The free end of the bar 36 terminates in a handle 40 by means of which it may be manipulated for varying the position of the toggle pivot 32 and thereby varying the position of the electrodes with respect to the work.

To preclude passage of current through the electrode until adequate pressure is exerted against the work, I provide a circuit controller that is actuated by movement of the arm 36 and is so arranged that current is prevented from flowing until the arm is moved a predetermined distance in its path of travel. Thus in Fig. 1, the arm is shown in one position while in Fig. 3, it is shown in a different position. Fig. 1 illustrates the relationship of the parts during the welding operation, and Fig. 3 shows the relationship before the electrodes are applied to the work.

The mechanism for controlling the flow of current preferably comprises a switch, indicated in general at 45, that is suitably connected through conductors 46 to a relay (not shown) that controls the flow of current into the conductors 14 and 15. The switch 45 may be carried by the bracket 38 and may be actuated by a member that receives its movement from the arm 36. In the preferred arrangement such member comprises a set screw 50 that is carried by an arm 51 which, in turn, is fastened, as by welding or by other suitable means to a yoke member 55 through which the pivot pin 37 extends. The yoke member is slidably mounted in the bracket 38 and is normally urged toward a position tending to open the electrodes, by means of a spring 60 which surrounds the shank 61 and which is held in place by a plug 62. A suitable nut 63 engages a threaded portion on the shank for limiting movement of the yoke with reference to the bracket 38, and for holding the parts in assembled relationship.

The arrangement described requires the transmission of force through the spring 60, and hence, by choosing a spring of the proper size, it is possible to assure the exertion of the correct pressure of the electrodes against the work before the current is permitted to flow therethrough. The pressure to be exerted would vary with the thickness of the metal to be welded and therefore the loading on the spring may be varied to suit the work to be welded. The loading may be accomplished either by varying the position of the plug 62 or by substituting one spring for another.

To determine the point at which the circuit controller is to be actuated, I have shown the set screw 50 as being adjustably positioned within the arm 51 where it is readily accessible for manipulation. The adjustment therefore may be made for actuation of the current controller at any predetermined point in the path of travel of the arm 36. In practice, the adjustment is so made that the circuit is closed before the arm reaches the upper limit of its travel. In this way, the final pressure which is exerted upon the electrodes takes place while the current is flowing through the electrodes at which time the metal influenced by the current is rendered sufficiently plastic that a union under pressure can be made.

An advantage of the present invention is the fact that the circuit controller may form part of the gun construction, and that it is therefore readily accessible for adjustment at the time the tool is being used. The entire structure is rugged and compact, and is sufficiently light in weight that it may be used to good advantage without causing undue fatigue to the operator.

I claim:

1. A spot welding machine comprising electrodes having terminals pivotally mounted for movement relatively toward each other, a slidable connection for the pivot, a circuit controller carried by one of the electrodes, and means carried by the electrodes for operating the controller and for moving the electrodes a fixed amount upon actuation of the operating means.

2. A spot welding machine having electrodes pivotally mounted for movement relatively toward each other, a slidable connection for the pivot, a toggle device having a fixed throw for closing the electrodes and a circuit controller actuated by the toggle device, to energize the electrodes in timed relationship to the movement of the same.

3. A portable electric welder comprising electrodes having terminals pivotally mounted for movement toward each other, mechanism including a pair of toggle links having a fixed throw for operating the electrodes and means operable by said mechanism for controlling the circuit through the electrodes in timed relationship to the movement of the latter, said means including a yieldable member and means for varying the tension on said member whereby the pressure exerted by the electrode terminals against the work may be varied in accordance with the physical characteristics of the work.

4. A spot welding machine comprising electrodes having terminals pivotally mounted for movement toward each other, means for shifting the pivot along the electrodes, means adjacent the ends of the electrodes for operating them, said last named means including an operating handle and a spring through which force is transmitted from a handle to the electrodes, a circuit controller carried by one of the electrodes and operable upon movement of the handle to a predetermined position, and means for adjusting the circuit controller to permit closing of the same only when the electrodes are moved a predetermined extent toward each other.

5. A spot welding machine comprising two electrodes having terminals mounted for pivotal movement toward each other, a toggle link pivotally mounted on one of the electrodes, the other electrode having a member slidably mounted therein, a second toggle link pivotally connected to the member and to the first named link, and having an extension terminating in a handle, a spring interposed between the member and its associated electrode, a circuit controller carried by one of the electrodes, and a controller actuator carried by said member.

6. A spot welding machine having a pair of electrodes that are mounted for pivotal movement toward each other, a toggle device connecting the electrodes and disposed between them for moving them about the pivot and including a handle that forms a continuation of one member of the toggle, and a spring through which the applied force is transmitted to the electrodes, means for loading the spring and a circuit controller positioned adjacent the spring, said toggle device also including means for actuating the controller upon compression of the spring to a predetermined degree.

7. A spot welding machine comprising two electrodes having their terminals pivotally mounted for movement toward each other, means for moving the pivot along the electrodes, a toggle device having a fixed throw, carried by the electrodes and disposed between them at the ends opposite the terminals, said device including a pair of links, one of which terminates in a handle, and including a spring through which the force exerted by the handle is transmitted to the electrodes, a circuit controller carried by one of the electrodes, means operable upon movement of the toggle device for actuating the controller, to thereby energize the electrodes in timed relationship to the movement of the same, and means for adjusting the circuit controller to permit closing of the same only when the electrodes are moved a predetermined extent toward each other.

MERIL L. ECKMAN.